United States Patent

[11] 3,614,324

[72] Inventor Clair Alan Buzzard
Eatontown, N.J.
[21] Appl. No. 17,235
[22] Filed Mar. 6, 1970
[45] Patented Oct. 19, 1971
[73] Assignee Bell Telephone Laboratories, Incorporated
Murray Hill, Berkeley Heights, N.J.

[54] ARRANGEMENT FOR USING A DATA SET CARRIER DETECTOR TO DETECT INCOMING RINGING
7 Claims, 1 Drawing Fig.

[52] U.S. Cl. ...................... 179/2 DP, 179/6 R
[51] Int. Cl. ...................... H04m 11/06
[50] Field of Search ...................... 179/2 DP, 3, 4, 84 T, 84 R, 5, 6 R, 6 CO, 6 E, 6 D, 18 BE, 1 HF

[56] References Cited
UNITED STATES PATENTS
3,555,189 1/1971 Quatse ...................... 179/1 HF
3,307,149 2/1967 Doktor ...................... 340/171
FOREIGN PATENTS
1,153,095 8/1963 Germany ...................... 179/84 T

*Primary Examiner*—Kathleen H. Claffy
*Assistant Examiner*—Tom D'Amico
*Attorneys*—R. J. Guenther and Kenneth B. Hamlin

ABSTRACT: A terminating or answer-only data set terminates a telephone line by way of a hybrid transformer whose winding on the data set side is connected between the data set transmitter and receiver to apply transmitted signals to the line and to apply incoming line signals to the receiver. While the data set is on-hook, the transmitter sends a steady tone. Threshold devices (reversely poled diodes) are connected across the line and conduct in response to ringing signals on the line, placing a low-impedance shunt across the line side winding of the hybrid transformer. This low impedance is reflected across to the data set side winding which thereby passes the transmitted tone to the receiver to indicate the detection of incoming ringing signals.

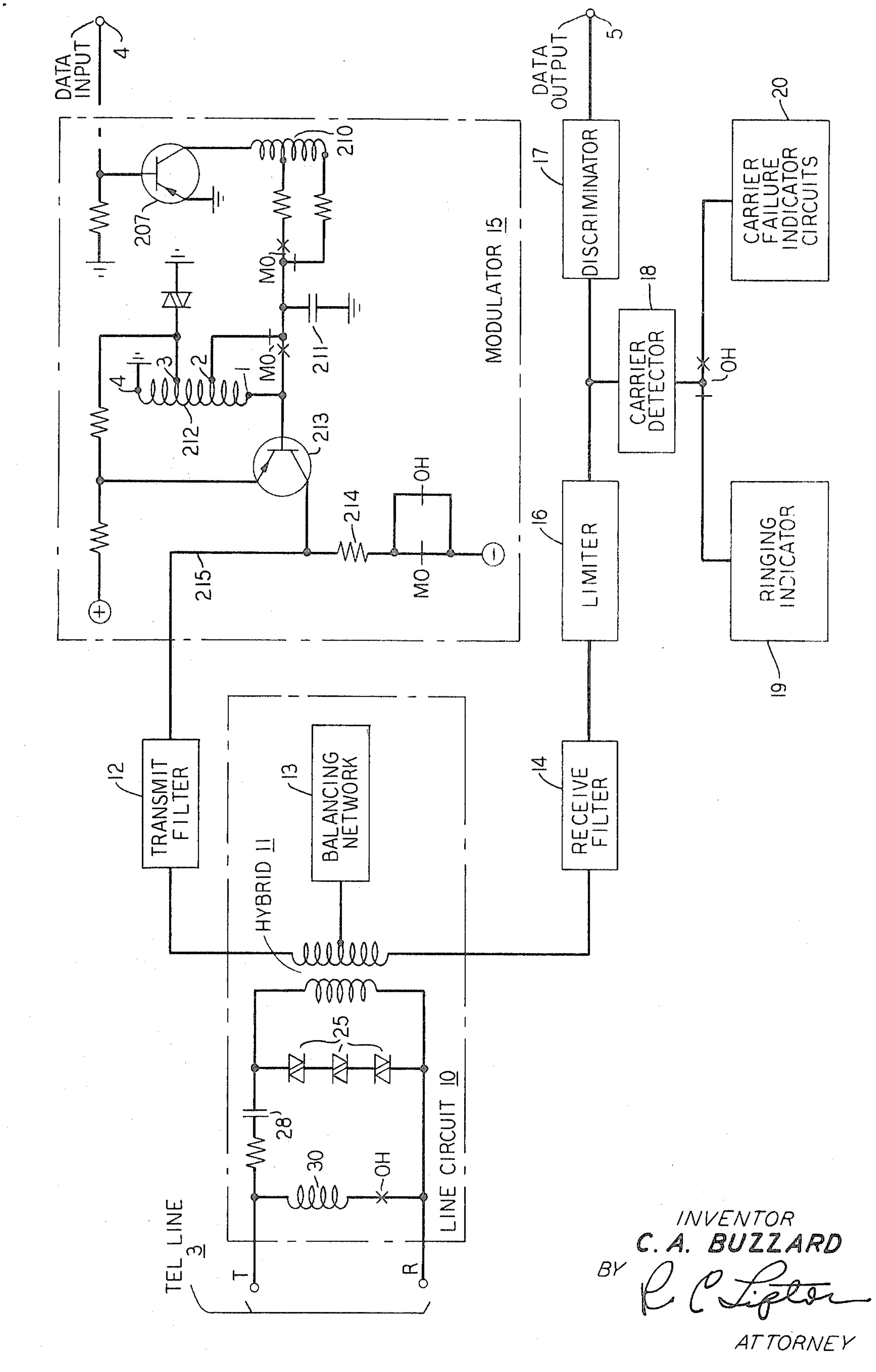
INVENTOR
C. A. BUZZARD
BY R. C. Lipton
ATTORNEY

ARRANGEMENT FOR USING A DATA SET CARRIER DETECTOR TO DETECT INCOMING RINGING

FIELD OF THE INVENTION

This invention relates to subscriber station data sets arranged to answer calls from remote stations and, more particularly, to ringing signal detectors for data sets.

DESCRIPTION OF THE PRIOR ART

Subscriber station data sets are now arranged to communicate over telephone subscriber lines by way of the telephone switching network. The data set transmitter converts outgoing data to voice frequency signals and the data set receiver converts incoming voice frequency signals to the corresponding baseband data to enable the exchange of the data over the telephone lines.

Preferably, the data set is provided with a subscriber line circuit which includes a hybrid transformer whose data set side winding is connected between the data set transmitter and receiver to thereby pass the transmitter output signals to the line and pass the incoming line signals to the receiver. On the line side of the hybrid transformer, the line circuit also includes switchhook contacts, a dialer and a ringer to originate and to terminate or answer calls.

In a typical call, the originating set goes "off-hook" and, when dial tone is returned by the telephone central office, the appropriate digits of the desired remote subscriber are dialed. The telephone network thereupon extends the call to the remote subscriber and applies ringing signals to the line of the subscriber. The called subscriber answers the call, by going "off-hook," and returns voice frequency tone signals to initiate a connect or "handshaking" sequence with the originating set, enabling the data sets and the switching networks to provide various supervisory functions.

Upon the conclusion of the handshaking sequence, the data sets proceed to interchange the frequency shift data signals. Preferably, each station transmits the data signals in one voice frequency band and receives the signals in another frequency band. The calling station may, for example, arrange its transmitter to send in the lower frequency band and arrange its receiver to detect incoming signals in the upper frequency band while the terminating station sends the upper frequency band signals and receives the lower frequency band signals.

Frequently, a subscriber station (generally unattended) is utilized to only answer calls. Stations of this type can be greatly simplified by eliminating therefrom all the equipment required solely for originating calls (such as the dialer). It is an object of the present invention to further simplify the station data set. More specifically, it is an object of this invention to eliminate the ringing signal detector by detecting the ringing signals with equipment presently available in the data set.

SUMMARY OF THE INVENTION

In accordance with the objectives of the invention, locally generated voice frequency signals are passed to the terminating set—s receiver when ringing signals are received. With the data set in an idle mode prior to answering a call, the receiver identifies the locally generated voice frequency signals as ringing signals. Advantageously, the voice frequency signals are generated by the terminating set transmitter which, prior to answering a call, is arranged to send tone signals in the (lower) frequency band normally transmitted by the originating station. The terminating station receiver is therefore able to detect the tone signals.

It is a feature of this invention that a low-impedance shunt is placed across the line side winding of the hybrid transformer in the subscriber line circuit. This low impedance is reflected across to the data set side winding, whereby the output of the transmitter is passed by way of the winding to the receiver input. The low impedance is provided by current-conducting diodes which are arranged to conduct when the amplitude of the line signals exceeds a threshold which is above the amplitude of voice frequency data signals but well below the amplitude of the peaks of the ringing signal. The foregoing and other objects and features of this invention will be more fully understood from the following description of an illustrative embodiment taken in conjunction with the accompanying drawing.

BRIEF DESCRIPTION OF THE DRAWING

The single FIGURE of the drawing shows, in schematic form, the details of circuits of a data set which cooperate to answer calls in accordance with this invention.

DETAILED DESCRIPTION

The subscriber station data set shown in the drawing is connected to a telephone line pair, identified as telephone line 3. The telephone line extends from line circuit 10 in the data set to a conventional telephone switching office (not shown). Included in the data set, and connected to line circuit 10, are transmit filter 12 and receive filter 14. Connected to transmit filter 12 is modulator 15. Receive filter 14 is connected to limiter 16 which, in turn, is connected to discriminator 17 and to carrier detector 18. The output of carrier detector 18 extends by way of the break contacts of relay OH (whose energizing winding is not shown) to ringing indicator 19 and extends by way of the make contacts of relay OH to carrier failure indicator circuits 20. The data set may further include other equipment and circuitry, such as timing and logic circuitry, for providing various supervisory functions. The latter equipment and circuitry is preferably arranged to provide the functions in the same manner as corresponding equipment shown in U.S. Pat. No. 3,307,149, issued to T. L. Doktor et al. on Feb. 28,1967.

The data set shown in the drawing is arranged to only terminate or answer calls. Limiter 16, discriminator 17 and carrier detector 18 are therefore preferably arranged in a manner similar to the corresponding circuitry disclosed in the T. L. Doktor et al. patent when the data set in the patent is operated in the terminating mode to answer calls. Similarly, modulator 15 is arranged similar to the modulator shown in FIG. 2 of the Doktor et al. patent, with at least one significant exception, as described hereinafter. Finally, relay OH in the present data set corresponds to relay 3–OH shown in FIG. 3 of the patent.

Since the data set is arranged to terminate calls, calls may therefore be received by way of telephone line 3 from a remote data set. These calls may be switched through one or more switching offices in addition to the telephone office connected to telephone line 3. The data set, in response to the call, goes off-hook, as described hereinafter, initiating a connect or handshaking sequence, as described in detail in the Doktor et al. patent, and thereafter proceeds to exchange data information with the remote data set.

The outgoing locally generated binary DC data is applied to data input terminal 4 and then passed to modulator 15. Modulator 15, in turn, converts the data to frequency shift signals in an upper frequency band (hereinafter referred to as the $F_2$ band) within the voice band frequency. This frequency shift signal is then passed through transmit filter 12 to hybrid 11 in line circuit 10. Hybrid 11, with balancing network 13, arranges then to pass the frequency shift signals to telephone line 3. Incoming frequency shift signals from the remote data set in a lower frequency band (hereinafter referred to as the $F_1$ band) are received by line circuit 10 from telephone line 3. These frequency shift signals are passed to hybrid 11 and then, by way of receive filter 14, through limiter 16 to discriminator 17. Discriminator 17, in turn, converts the frequency shift signals to binary DC signals for application to data output terminal 5. At the same time, carrier detector 18 monitors the output of limiter 16. When the data set answers a call, relay OH is operated, as described in the Doktor et al. patent. If carrier signals should cease, this indication is passed by way of the make contacts of relay OH to carrier failure indicator circuits 20. These latter circuits may comprise any suitable indicator arrangement which provides electrical, audible, or visual indications upon the application of the indication passed by carrier detector 18 that the carrier signal has ceased.

Considering now line circuit 10, it is seen that the tip lead of telephone line 3 is connected thereto and then, by way of capacitor 28, to the line side transformer winding of hybrid 11. The other terminal of the line side transformer winding then extends to the ring lead of telephone line 3. Connected across the tip and ring leads are make contacts OH and inductor 30. Reversely poled diodes (varistors) 25 are connected in series across the line side transformer winding. The threshold of the diodes in series is arranged to be above the amplitude of the incoming and outgoing frequency shift signals but well below the amplitude of the peaks of incoming ringing signals, for reasons described hereinafter.

The transformer winding of hybrid 11 on the data set side is connected from its upper terminal, as seen in the drawing, to transmit filter 12 and from its lower terminal to receive filter 14. Balancing network 13 is connected to the midpoint of the data set side transformer winding, whereby hybrid 11 is arranged to pass outgoing signals from transmit filter 12 to telephone line 3 and pass incoming signals from telephone line 3 to receive filter 14. It is to be noted that line circuit 10 does not include a ringing signal detector.

Transistor 207 is a keyer for modulator 15 and governs the frequency shift between the marking and spacing signaling conditions. When a marking signal is to be transmitted a negative potential is applied to data input terminal 4 and, therefore, to the base of transistor 207, causing it to conduct. Conversely, when a spacing signal is to be transmitted, a relatively positive potential is applied to data input terminal 4, sufficient to turn transister OFF. When transister 207 conducts, ground is applied by way its emitter to the collector. It is seen that the collector extends to inductor 210 and then, by way of a midpoint terminal on inductor 210, to the make contacts of relay MO or, alternatively, by way of a lower terminal on inductor 210, to the break contacts of relay MO.

Relay MO corresponds to relay 3–MO shown in FIG. 3 of the T. L. Doktor et al. patent. As described in the patent, the relay is normally operated when the data set is idle and releases after the data set answers a call and remains released during the handshaking sequence and the exchange of data information.

When relay MO is released, inductor 210 is connected to capacitor 211 and to that portion of inductor 212 designated terminal 2. Capacitor 211 and inductor 212, in turn, are connected to the base of transistor oscillator 213 and constitute the tank circuit for the oscillator Since relay MO is released (and the data set has therefore answered a call), capacitor 211 is therefore connected to terminal 2 of inductor 212, reducing the amount of inductance across the capacitor and therefore resulting in a basic frequency in the higher, or $F_2$, band. If we assume that a marking signal is rendering transistor 207 conductive, ground on the collector connects inductor 210 across capacitor 211, further reducing the tank circuit inductance, whereby the oscillator operates at a higher frequency in the $F_2$ band, which frequency is chosen to represent the marking condition. Conversely, when a spacing signal is being transmitted and transistor 207 is nonconductive, shunting inductor 210 is removed from the tank circuit and the frequency is decreased in the $F_2$, band corresponding to the spacing frequency.

If the data set is idle, relay MO is operated and capacitor 211 is connected to terminal 1 of inductor 212. This increases the amount of inductance across the capacitor and results in a basic frequency in a lower, or $F_1$, frequency band. In the idle condition, an idle marking signal is applied to data input terminal 4 and transistor 207 conducts. The portion of inductor 210 between terminals 1 and 2 therefore shunts the tank circuit and transistor oscillator 213 oscillates at a higher frequency in the $F_1$ band which is chosen to represent the idle marking frequency.

The collector of transistor 213 is connected by way of lead 215 to transmit filter 12. Transmit filter 12 is normally arranged to pass the signals in the $F_2$ band. In addition, transmit filter 12 will pass the marking frequency in the $F_1$ band although these latter signals will be attenuated.

Lead 215 is also connected to negative battery by way of resistor 214 and the break contacts of relay MO or, in shunt thereto, by way of the break contacts of relay OH. Initially, in the idle condition, relay MO is operated but relay OH is released. Accordingly, in the idle condition, with an idle marking signal applied to data input terminal 4, relay MO operated and relay OH released, modulator 15 is passing an idle marking signal in the $F_1$ band to lead 215 and then to transmit filter 12. This idle marking signal in the $F_1$ band is then attenuated and applied to hybrid 11 in line circuit 10.

Assume now that, with the data set in the idle condition and passing an attenuated idle marking signal in the $F_1$ band to line circuit 10, a remote data set initiates a call. This call is passed in the form of ringing signals over telephone line 3. The ringing signal is thus applied through capacitor 28 and across the line side transformer winding of hybrid 11. The amplitude of the ringing signal is sufficient to exceed the threshold voltages of reversely poled diodes 25. These diodes will thus conduct during the positive and negative peaks of the ringing signal. When the diodes are conducting they provide a low-impedance shunt across the line side transformer winding of hybrid 11. This low impedance is reflected across to the data set side transformer winding. The impedance of the data set side transformer winding is therefore substantially reduced during the peaks of the ringing signals and the attenuated idle marking signal from transmit filter 12 is passed therethrough to receive filter 14 and then to limiter 16. Carrier detector 18 now detects the idle marking signal passed during the ringing signal peaks and with relay OH released, passes these indications to ringing indicator 19. Ringing indicator 19 preferably comprises a conventional audible or visual indicator which provides the appropriate response to the indications provided by carrier detector 18.

The data set operator answers the call by operating an answer key corresponding to answer key 302 shown in FIG. 3 of the T. L. Doktor et al. patent. This operates relay OH. The operation of relay OH disconnects negative battery from the collector of transistor 213. Transistor 213 thus turns OFF and the idle marking signal in the $F_1$ band ceases. The operation of relay OH also connects inductor 30 across the tip and ring leads of telephone line 3. This completes the DC circuit across the telephone line, providing an off-hook signal to the central office. The central office, upon receiving the off-hook signal, discontinues the transmission of the ringing signal. Reversely poled diodes 25 cease conducting and the shunt is removed across the line side transformer winding of hybrid 11. It is noted that although inductor 30 completes the DC circuit, it will block alternating current signals to preclude the signal shunting of the line side transformer winding of hybrid 11. Finally, the operation of relay OH disconnects ringing indicator 19 from carrier detector 18 and connects the output of carrier detector 18 to carrier failure indicator circuits 20.

As described in the T. L. Doktor et al. patent, the relay corresponding to relay MO releases 1 second after the off-hook signal is returned to the central office. (This 1 second interval is a guard interval to permit the off-hook signal to propagate through the various central offices to permit operation of supervisory functions in the central office.) Upon the release of relay MO, transistor oscillator 213 is arranged to oscillate in the $F_2$ band as previously described. In addition, with relay MO released, negative battery is again applied through resistor 214 to the collector of transistor 213. With an idle marking signal still being applied to data input terminal 4, modulator 15 thus applies a marking signal in the $F_2$ band to transmit filter 12. This marking signal is then returned to telephone line 3 to initiate the handshake sequence with the remote data set, as described in the T. L. Doktor et al. patent. In addition, modulator 15 is now arranged to accept data signals from data input terminal 4 and apply frequency shift marking and spacing signals in the $F_2$ band to transmit filter 12 and then, by way of line circuit 10, to telephone line 3. The data set thus proceeds to operate in the manner disclosed in the T L. Doktor et al. patent.

Although a specific embodiment of this invention has been shown and described, it will be understood that various modifications may be made without departing from the spirit of this invention.

I claim:

1. A data set for answering calls from an incoming line including a data transmitter for transmitting signals, said data transmitter being arranged to normally generate signals in a first voice frequency band, means for receiving signals in a second voice frequency band, means for applying the generated signals to the line and for applying incoming voice frequency signals on the line to the receiving means, and means for detecting line ringing signals outside the first and second voice frequency bands to indicate an incoming call from another station, characterized in that the detecting means includes means for generating signals in the second voice frequency band before the data set answers a call and means responsive to the ringing signals for sending the generated second voice frequency band signals to the receiving means.

2. A data set in accordance with claim 1 wherein the generating means comprises means for arranging the data transmitter to generate signals in the second voice frequency band.

3. A data set in accordance with claim 1 wherein the detecting means further includes means for detecting the application of second voice frequency band signals to the receiving means before the data set answers a call to indicate the presence of ringing signals on the line.

4. A data set in accordance with claim 1 wherein the applying means comprises a hybrid transformer having a line side winding coupled to the line and a data set side winding connected between the output of the data transmitter and the input of the receiving means characterized in that the sending means comprises means for placing a low impedance across the line side winding when incoming ringing signals are on the line whereby the generated second voice frequency signals are sent to the input of the receiving means by way of the data set side winding.

5. A data set in accordance with claim 4 wherein the placing means comprises current conducting means connected across the line side winding and arranged to conduct when the amplitude of the signals on the line exceed a threshold which is greater than the amplitude of voice frequency signals and less than ringing signals.

6. A data set for answering calls from an incoming line including a voice frequency signal transmitter, a voice frequency signal receiver, and a hybrid transformer having a line side winding coupled to the line and a data set side winding connected between the transmitter output and the receiver input to pass the transmitter output signals to the line and to pass incoming voice frequency signals on the line to the receiver input, characterized in that the data includes means to operate the transmitter to send signals when the data set is idle and means responsive to incoming ringing signals on the line to place a low impedance across the line side winding whereby the transmitter signals are passed to the receiver input by way of the data set side winding.

7. A data set in accordance with claim 6 wherein the place means includes current conducting means connected across the line side winding and arranged to conduct when the signals on the line exceed a predetermined threshold.